US012717031B2

(12) United States Patent
Fidric et al.

(10) Patent No.: US 12,717,031 B2
(45) Date of Patent: Aug. 25, 2026

(54) LIGHT DETECTION AND RANGING DEVICE USING COMBINED OPTICAL SIGNALS

(71) Applicant: Waymo LLC, Mountain View, CA (US)

(72) Inventors: Bernard Fidric, Cupertino, CA (US); Pierre-Yves Droz, Los Altos, CA (US); Michael R. Matthews, Portola Valley, CA (US); Pablo Hopman, Mountain View, CA (US); John Lam, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 110 days.

(21) Appl. No.: 18/794,503

(22) Filed: Aug. 5, 2024

(65) Prior Publication Data

US 2024/0393461 A1 Nov. 28, 2024

Related U.S. Application Data

(63) Continuation of application No. 17/500,829, filed on Oct. 13, 2021, now Pat. No. 12,055,630.

(Continued)

(51) Int. Cl.
*G01S 17/26* (2020.01)
*B60W 60/00* (2020.01)

(Continued)

(52) U.S. Cl.
CPC ........... *G01S 17/26* (2020.01); *B60W 60/001* (2020.02); *G01S 7/4815* (2013.01); *G01S 17/58* (2013.01);

(Continued)

(58) Field of Classification Search
CPC ....... B60W 2420/40; B60W 2420/403; B60W 2420/408; B60W 2420/54; B60W 60/001;

(Continued)

(56) References Cited

U.S. PATENT DOCUMENTS 5,283,795 A 2/1994 Fink
5,574,537 A 11/1996 Ozawa (Continued)

FOREIGN PATENT DOCUMENTS

CN 101236253 A 8/2008
CN 111796297 A 10/2020
CN 111999739 A 11/2020

OTHER PUBLICATIONS

AEYE iDAR "iDAR is Smarther than LiDAR", aeye.ai/idar/, retrieved Oct. 20, 2020, 11 pages.

(Continued)

*Primary Examiner* — Tyler J Lee
(74) *Attorney, Agent, or Firm* — Christensen O'Connor Johnson Kindness PLLC

(57) ABSTRACT

The subject matter of this specification relates to a light detection and ranging (LiDAR) system. In at least one implementation, the LiDAR system comprises a first signal source; a second signal source; a combiner to generate a hybrid transmission signal from signals generated by the first signal source and the second signal source; a first photodetector to measure a first component of a reflection signal related to range of a target; and a second photodetector to measure a second component of the reflection signal related to velocity of the target, wherein the system is configured to derive the range and velocity of the target from the first component and the second component, respectively.

20 Claims, 11 Drawing Sheets

Related U.S. Application Data

(60) Provisional application No. 63/092,167, filed on Oct. 15, 2020.

(51) Int. Cl.
*G01S 7/48* (2006.01)
*G01S 7/481* (2006.01)
*G01S 17/58* (2006.01)
*G01S 17/93* (2020.01)
*G01S 17/931* (2020.01)

(52) U.S. Cl.
CPC ........ *G01S 17/931* (2020.01); *B60W 2420/40* (2013.01); *B60W 2420/403* (2013.01); *B60W 2420/408* (2024.01); *B60W 2420/54* (2013.01)

(58) Field of Classification Search
CPC .......... G01S 17/10; G01S 17/26; G01S 17/32; G01S 17/58; G01S 17/87; G01S 17/931; G01S 7/4814
See application file for complete search history.

(56) References Cited

U.S. PATENT DOCUMENTS 8,112,223 B2 2/2012 Jordan et al.
8,687,173 B2 4/2014 Rezk et al.
9,851,470 B2 12/2017 Henderson et al.
10,436,906 B2 10/2019 Droz
10,914,821 B2 * 2/2021 Patterson ............. G01S 7/4815
10,914,822 B2 * 2/2021 Kremer ................. G01S 7/4815
10,976,414 B2 * 4/2021 Sayyah ................. G01S 7/4815
11,092,671 B2 * 8/2021 Sarkissian ............. G01S 7/4815
11,156,715 B1 * 10/2021 Avci ...................... G01S 7/4816
11,226,403 B2 * 1/2022 Sayyah ................. G01S 7/4815
11,320,522 B1 * 5/2022 Avci ...................... G01S 7/4911
11,592,560 B2 2/2023 Schmalenberg et al.
2002/0071109 A1 6/2002 Allen et al.
2005/0213075 A1 9/2005 Cooke
2010/0073222 A1 3/2010 Mitomo et al.
2010/0128744 A1 5/2010 Deladurantaye et al.
2013/0027240 A1 1/2013 Chowdhury
2013/0044309 A1 * 2/2013 Dakin ..................... G01S 17/89 356/4.09
2014/0063484 A1 3/2014 Tauro et al.
2014/0209798 A1 7/2014 Woodward et al.
2016/0299228 A1 * 10/2016 Maleki .................... G01S 17/89
2016/0377721 A1 * 12/2016 Lardin .................... G01S 17/58 356/5.09
2018/0100929 A1 * 4/2018 O'Keeffe .............. G01S 17/931
2018/0180739 A1 6/2018 Droz
2018/0217234 A1 8/2018 Skowronek
2018/0267151 A1 9/2018 Hall et al.
2019/0018110 A1 * 1/2019 Kremer ................. G01S 7/4815
2019/0018112 A1 * 1/2019 Sayyah ................. G01S 7/4815
2019/0018121 A1 * 1/2019 Sayyah ................. G01S 7/4815
2019/0018139 A1 * 1/2019 Sayyah ................. G01S 7/4815
2019/0018140 A1 * 1/2019 Sarkissian ............. G01S 7/4815
2019/0086518 A1 3/2019 Hallstig et al.
2019/0195665 A1 * 6/2019 Soga .................. G01D 5/35364
2019/0257641 A1 8/2019 Tsuchida
2019/0265334 A1 8/2019 Zhang et al.
2019/0339389 A1 11/2019 Russo et al.
2020/0090355 A1 3/2020 Hall
2020/0142066 A1 * 5/2020 Sandborn ................ G01S 7/491
2020/0166645 A1 * 5/2020 Koduri .................... G01S 7/003
2020/0217961 A1 * 7/2020 Russo ................... G01S 7/4911
2020/0241115 A1 * 7/2020 Schmalenberg ........ G01S 17/32
2020/0300980 A1 * 9/2020 Behzadi ................ G01S 7/4812
2020/0319314 A1 * 10/2020 Behzadi .................. G01S 17/89
2020/0389606 A1 * 12/2020 Petilli .................. G05D 1/0289
2020/0400798 A1 * 12/2020 Rezk ....................... G01S 17/08
2021/0096228 A1 * 4/2021 Behzadi ................ G01S 7/4815
2021/0149041 A1 5/2021 Cho et al.
2021/0173083 A1 * 6/2021 Shin ...................... G01S 7/4808
2021/0318435 A1 10/2021 Schmalenberg et al.
2021/0356588 A1 * 11/2021 El Amili ............... G01S 7/4861
2021/0382370 A1 12/2021 Di Teodoro et al.
2021/0396887 A1 * 12/2021 Schmalenberg ........ G01S 17/86
2021/0405203 A1 12/2021 Barber et al.
2022/0011434 A1 * 1/2022 Rainko ................. G01S 17/894
2022/0404498 A1 * 12/2022 Uetsuka ................ G01S 7/4815

OTHER PUBLICATIONS

Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.
Lekavich, John, "Basics fo Acousto-Optic Devices", Lasers & Applications Apr. 1986, pp. 59-64.
Marino, A.M. et al., "Phase-Locked Laser System for Use in Atomic Coherence Experiments", Review of Scientific Instruments 79, 013104 (2008), published online Jan. 11, 2008, pp. 013104-1-013104-8.
International Search Report and Written Opinion dated Mar. 30, 2022, on application No. PCT/US2021/061481, 10 pages.
International Search Report and Written Opinion dated Feb. 7, 2022, on application No. PCT/US2021/055093, 14 pages.

* cited by examiner

LIGHT DETECTION AND RANGING DEVICE USING COMBINED OPTICAL SIGNALS

CROSS-REFERENCE TO RELATED APPLICATION(S)

The instant application is a continuation of U.S. Non-Provisional patent application Ser. No. 17/500,829, filed on Oct. 13, 2021, which claims the benefit of priority of U.S. Provisional Patent Application No. 63/092,167, filed on Oct. 15, 2020, the disclosures of which are hereby incorporated by reference herein in their entireties.

TECHNICAL FIELD

The instant specification generally relates to range and velocity measurements in applications that involve determining locations and velocities of moving objects.

BACKGROUND

Various automotive, aeronautical, marine, atmospheric, industrial, and other applications that involve tracking locations and motion of objects benefit from optical and radar detection technology. A light detection and ranging (LiDAR) device operates by emitting a series of signals that travel to an object and then detecting signals reflected back from the object. By determining a time delay between a signal emission and an arrival of the reflected signal, direct detection LiDAR can determine a distance to the object. Additionally, the velocity (i.e., speed and direction) of the object's motion can be determined by emitting two or more signals in a quick succession and detecting a changing position of the object with each additional signal.

Coherent LiDAR devices, which utilize the Doppler effect, can determine a longitudinal (radial) component of the object's velocity by detecting a change in the frequency of the arrived wave from the frequency of the emitted signal. When the object is moving away from (towards) the rangefinder, the frequency of the arrived signal is lower (higher) than the frequency of the emitted signal, and the change in the frequency is proportional to the radial component of the object's velocity.

Direct detection LiDAR and coherent LiDAR each have unique attributes and advantages that are suitable for use in different applications. Some attempts have been made to add range detection functionality, a core functionality in direct detection LiDARs, to coherent LiDAR systems. However, such coherent systems face challenges inherent to high-feature coherent LiDAR systems, such as increased system complexity.

BRIEF DESCRIPTION OF THE DRAWINGS

The present disclosure is illustrated by way of examples, and not by way of limitation, and can be more fully understood with references to the following detailed description when considered in connection with the figures, in which.

DETAILED DESCRIPTION

Figure 1:
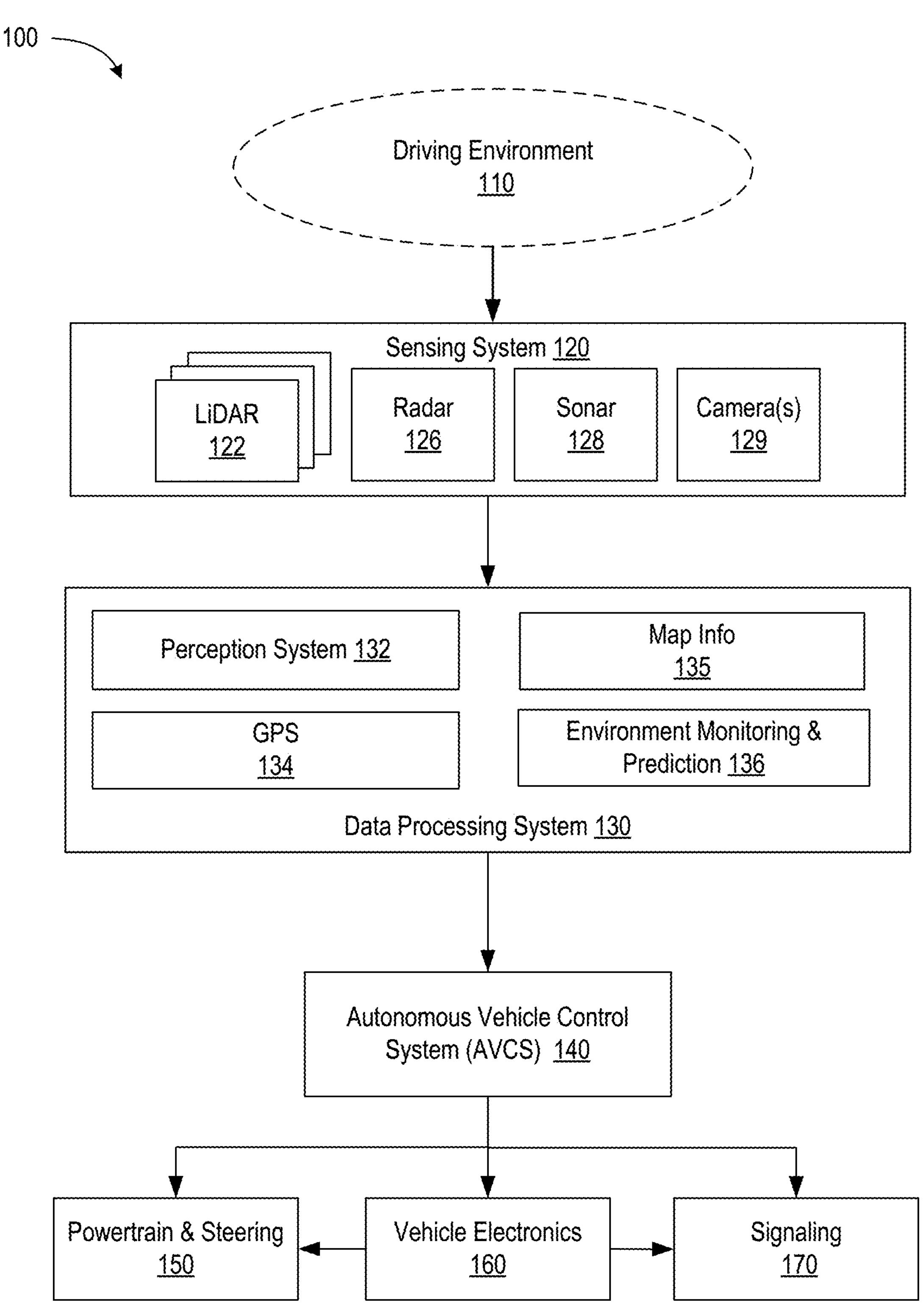
FIG. 1 is a diagram illustrating components of an example autonomous vehicle that uses Doppler-assisted object identification and tracking in accordance with some implementations of the present disclosure.

LiDAR technology is used in autonomous vehicles, highway traffic control, aviation traffic control, naval vessel detection and navigation, military operations, police enforcement, animal control, atmospheric studies, marine studies, and many other applications. A LIDAR unit (also referred to herein as a "LiDAR") emits one or more laser signals (beams, pulses) that travel to an object and then detects signals reflected from the object. Subsequently, the LiDAR processes the information carried by the signals. The information can include a time of flight, a frequency change or a phase shift, reflectivity of the surface of the object, type and quality of the surface, and so on. Reliable, quick, and efficient determination of the velocities of various objects is one of the main objectives of the LiDAR detection technology.

Even though the existing technology is capable of determining the speed and the direction of an object's motion, the accuracy and efficiency of such technology is typically limited. The time-of-flight (ToF) measurements do not detect the velocity directly, but instead determine two (or more) locations $\vec{r}(t_1)$, $\vec{r}(t_2)$ (which can be characterized by a coordinate system such as Cartesian, spherical, cylindrical, etc.) and infer the velocity as the ratio, $$\vec{v} = \frac{\vec{r}(t_2) - \vec{r}(t_1)}{t_2 - t_1}.$$

By design, the measured velocity $\vec{v}$ is not the instantaneous velocity of the object but rather the velocity averaged over the time interval $t_2-t_1$. The existing technology does not allow for determination of whether the object maintained the same velocity v during this time or experienced an acceleration or deceleration. Increasing resolution by reducing the duration of the measurement time $t_2-t_1$ is possible but has a limited utility. As the position and time can be measured only with some intrinsic accuracy of the device $\Delta\vec{r}$ and $\Delta t$ (being limited by the wavelength, precision of various optical and electronic components of the LiDAR, information processing delays, and so forth), reducing the differences $\vec{r}(t_2)-\vec{r}(t_1)$ and $t_2-t_1$ is viable only when these differences remain larger than the corresponding accuracies $\Delta\vec{r}$ and $\Delta t$. Otherwise, the signal-to-noise ratio decreases and the accuracy of the velocity determination deteriorates. For example, the signal may be more susceptible to various noise sources, such as thermal noise, quantum noise, amplifier noise, and background noise (e.g., noise arising from bright environments).

Coherent LiDARs operate by detecting a change in the frequency of the returned signal—the Doppler shift indicative of the velocity of the reflecting surface. Such detection is capable of determining, using a single laser signal, the radial component of the velocity parallel to the direction of the signal propagation. However, the Doppler shift is not sensitive to the lateral motion of the object (up or down, left or right). Accordingly, determination of the lateral motion still requires application of the existing ToF multiple-measurement tracking technology and even then it requires tracking a lateral motion of the entire object (e.g., motion of a contour or outline of the object), which is, optically and computationally, a rather complex operation.

In general, the combination of ToF and velocity detection methods is performed using two separate devices each having distinct optical circuits. Owing to this separation, however, the combined data obtained from the separate devices can result in deviations in accuracy and inconsistencies even when attempting to scan the same targets and locations at the same time. More recent attempts have been made to modify coherent LiDAR devices to include range detection functionality by modulating a continuous wave (CW) signal, which face challenges resulting from increased complexity.

Aspects and implementations of the present disclosure address these and other shortcomings of the existing technology by describing systems and methods that combine pulsed and continuous optical signals to provide direct range measurements and direct velocity measurements. Rather than being a direct detection system or a coherent system, LiDAR systems described herein utilize combined pulsed and continuous optical signals that can be combined within a common optical circuit prior to transmission, which solve some of the challenges and trade-offs associated with current LiDAR devices.

In certain implementations, the system, which can be provided as a single modular device for mounting on vehicles, generates a pulsed optical signal for range scanning and a CW optical signal for velocity scanning, which are combined and propagated along a common optical path prior to transmission. The system then receives a reflection signal from a target and transmits the reflection signal to a photodetector for downstream processing. The system utilizes bidirectional amplifiers that may be configured to amplify each signal independently or together. In certain implementations, the combined signal may be amplified prior to transmission or after being reflected by the target.

Several variations in the system design are possible by configuring the manner in which the different signals are amplified. In one implementation, a pulsed optical signal (corresponding to a range or "time-of-flight" LiDAR signal) is amplified, combined with an unamplified CW optical signal from a continuous laser source (corresponding to a velocity LiDAR signal), and then the combined signal is amplified by a bi-directional amplifier prior to transmission. The reflection signal is received and amplified by the bi-directional amplifier and transmitted to a photodetector.

In another implementation, the pulsed laser signal is amplified twice by two different amplifier circuits and then combined with the CW optical signal (which is not amplified). The received reflection signal is then transmitted to the photodetector without further amplification.

In yet another implementation, an amplified pulsed laser signal is combined with an unamplified CW optical signal and then amplified prior to transmission. The received reflection signal is then transmitted to the photodetector without further amplification.

Each of these configurations may utilize amplifiers such as erbium-doped fibers and semiconductor-based optical amplifiers. The photodetector may be, for example, a balanced photodetector that uses the unamplified CW optical signal as a reference.

Advantages of the implementations described herein include, but are not limited to: improved accuracy and consistency between range and velocity measurements due to the combination of pulsed and CW optical signals within a single optical circuit; optimal or near-optimal co-linear registration between the pulsed optical signal and CW optical signal pointing directions when they share the same optical path; reduced or eliminated range/velocity ambiguity compared with frequency-modulated continuous-wave (FMCW) sensors; reduced edge effects on a target when compared with FMCW sensors; the need to take only one measurement to distinguish range and velocity compared to FMCW sensors, which generally require at least two; and the need to utilize only a local oscillator that is fixed in time, allowing for longer measurement times that are advantageous when the targets are at significant distances from the sensor.

FIG. 1 is a diagram illustrating components of an example autonomous vehicle (AV) 100 that uses Doppler-assisted object identification and tracking, in accordance with some implementations of the present disclosure. The term "autonomous vehicle" or "AV" can refer to motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input). The term "object" can include any entity, item, device, body, or article (animated or unanimated) located outside the AV, such as roadways, buildings, trees, bushes, sidewalks, bridges, mountains, other vehicles, piers, banks, landing strips, animals, birds, or other stationary or dynamic objects.

A driving environment 110 of the AV 100 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. "Optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include a LIDAR sensor 122 (e.g., a LiDAR rangefinder, which may also be referred to herein as a "LiDAR" or "LiDAR"), which can be a laser-based unit capable of determining distances (e.g., using ToF technology) to the objects in the driving environment 110. The LiDAR sensor 122 can utilize wavelengths of electromagnetic waves that are shorter than the wavelength of the radio waves and can, therefore, provide a higher spatial resolution and sensitivity compared with the radar unit. The LiDAR sensor 122 can include a coherent LiDAR sensor, such as an FMCW sensor. The FMCW sensor can use optical heterodyne detection for velocity determination. In some implementations, the LiDAR sensor 122 is capable of determining both the distance to and the radial velocity of the reflecting object. In some implementations, the LiDAR sensor 122 can be configured to operate in an incoherent sensing mode (ToF mode) and/or a coherent sensing mode (e.g., a mode that uses heterodyne detection) or both modes at the same time. In some implementations, multiple LiDAR sensors 122 can be mounted on the AV 100, e.g., at different locations separated in space, to provide additional information about a transverse component of the velocity of the reflecting object. In some implementations, the LiDAR sensor 122 is configured for emitting signals that include combined pulsed and continuous waveforms, as shown in and described with respect to FIGS. 3-9.

The LiDAR sensor 122 can include one or more laser sources producing and emitting signals and one or more detectors of the signals reflected back from the objects. The LiDAR sensor 122 can include spectral filters to filter out spurious electromagnetic waves having wavelengths (frequencies) that are different from the wavelengths (frequencies) of the emitted signals. In some implementations, the LiDAR sensor 122 can include directional filters (e.g., apertures, diffraction gratings, and so on) to filter out electromagnetic waves that can arrive at the detectors along directions different from the retro-reflection directions for the emitted signals. The LiDAR sensor 122 can use various other optical components (lenses, mirrors, gratings, optical films, interferometers, spectrometers, local oscillators, and the like) to enhance sensing capabilities of the sensors.

In some implementations, the LiDAR sensor 122 can be a unit designed to scan 360 degrees along a horizontal direction. In some implementations, the LiDAR sensor 122 can be capable of spatial scanning along both the horizontal and vertical directions. In some implementations, the field of view can be up to 90 degrees in the vertical direction (so that at least a part of the upper hemisphere is covered by the LiDAR signals). In some implementations, the field of view can be a full sphere (consisting of two hemispheres). For brevity and conciseness, when a reference to "LiDAR technology," "LiDAR sensing," "LiDAR data," and "LiDAR," in general, is made in the present disclosure, such reference shall be understood to also encompass other electromagnetic sensing technology, such as the radar technology, where applicable.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations. In some implementations, the sensing system 120 can include one or more microphones to capture sounds from the environment, which, unlike sonars 128, avoid introducing acoustic waves into the environment.

The sensing data obtained by the sensing system 120 can be processed by a data processing system 130 of AV 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the LiDAR sensing data (coherent Doppler data and incoherent ToF data) to determine distances to various objects in the environment 110 and velocities (radial and, in some implementations, transverse, as described below) of such objects. In some implementations, the perception system 132 can use the LiDAR data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock. Using the LiDAR data, the perception system 132 can determine the distance from the rock to the AV and, therefore, by combining the distance information with the angular size of the rock, the perception system 132 can determine the linear dimensions of the rock as well.

In another implementation, using the LiDAR data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction. The perception system 132 can have a velocity reconstruction module (VRM) 133. VRM 133 can receive one or more sensor data frames from the sensing system 120. Each of the sensor frames can include multiple points. Each point can correspond to a reflecting surface from which a signal emitted by the sensing system 120 (e.g., by LiDAR sensor 122, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the LiDAR data whereas the angles can be independently known from a synchronizer data, a clock data, e.g., based on the known frequency of rotation of the transmitter within the horizontal plane. The velocity data can be provided to VRM 133 by the LiDAR sensor 122, in one implementation, based on Doppler-assisted sensing technology. VRM 133 can use one or more algorithms to reconstruct velocity distributions of various sets of points. The reconstructed velocity can be used by the perception system 132 for efficient and reliable detection and tracking of objects, as described in more detail below.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), audio data from microphones, and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
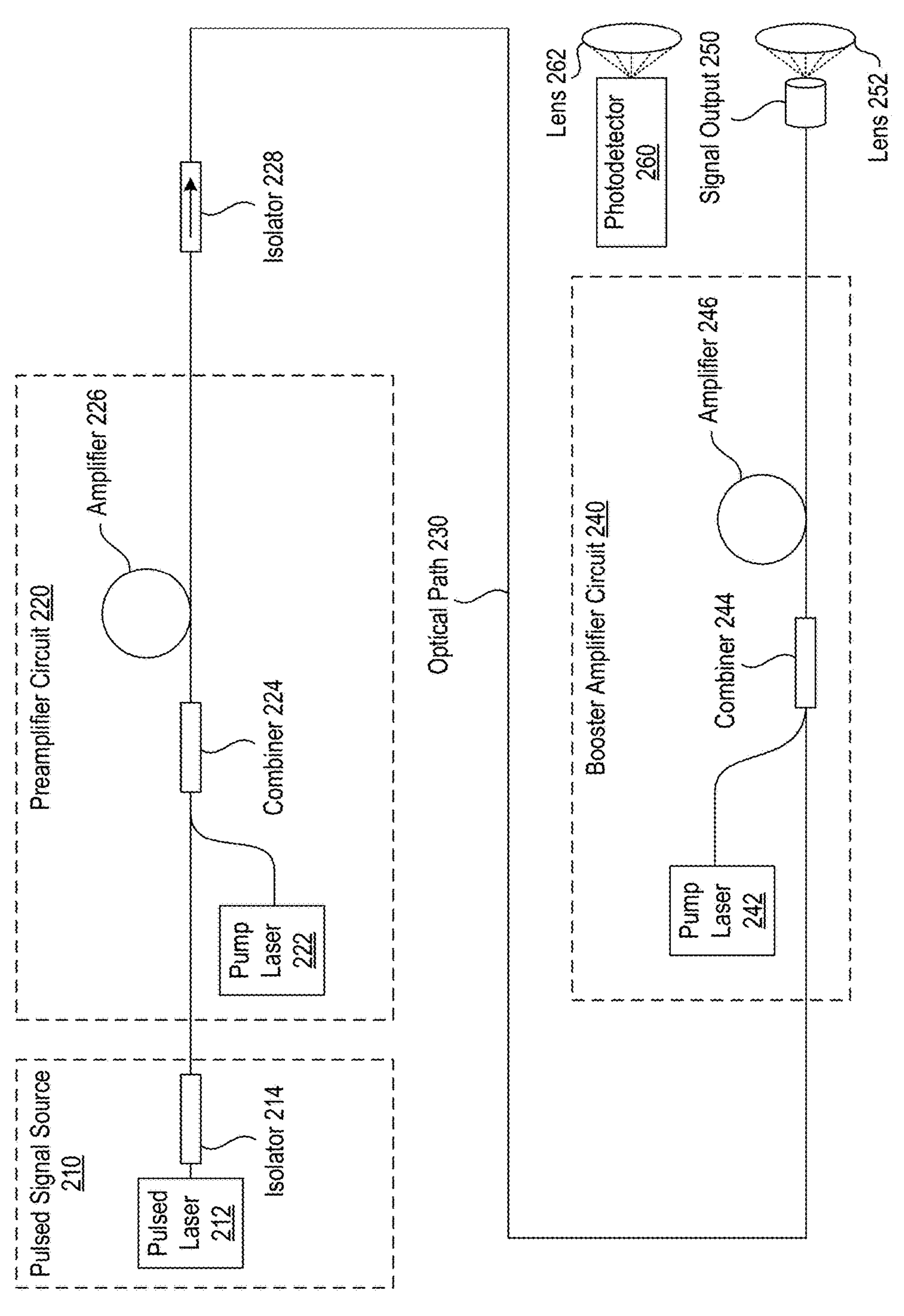
FIG. 2 depicts a base optical circuit for generating a pulsed optical signal.

FIG. 2 depicts a base optical circuit 200 for generating a pulsed optical signal, which is modified in subsequent drawings in accordance with aspects of the present disclosure. The base optical circuit 200 may be representative of at least a portion of the LiDAR sensor 122 of FIG. 1. The base optical circuit 200 includes a pulsed signal source 210, a preamplifier circuit 220, a booster amplifier circuit 240, and a signal output 250, all disposed along a single optical path 230. In some implementations, an entirety of the optical path 230 is defined by a fiber optic cable. In other implementations, one or more portions of the optical path 230 may include free space and additional components to direct and focus the optical signal propagating therethrough, including, but not limited to, one or more waveguides, lenses (e.g., multi-actuator adaptive lenses, collimating lenses, etc.), mirrors, and apertures. In some implementations, the signal output 250 includes a fiber channel/angled physical contact (FC/ACP) connector. In some implementations, a lens 252 downstream from the signal output ("transmission lens") is included to facilitate transmission of a signal generated by the base optical circuit 200 ("transmission signal") as well as collimate a reflection of the transmission signal off of an object ("reflection signal") into the base optical circuit.

In some implementations, the base optical circuit 200 further includes a photodetector 260 that is separate from the optical path 230. In some implementations, the photodetector 260 is an avalanche photodetector capturing a pulsed component of the reflection signal. In some implementations, the photodetector 260 is a silicon photomultiplier (SiPM). In some implementations, a lens 262 is included to collimate the reflection signal prior to reaching the photodetector 260. In some implementations, one or more of the optical circuits described herein may include a tap coupler near the signal output 250 to tap out a portion of the reflection signal (e.g., received via the lens 252) directly to the photodetector 260.

In some implementations, the pulsed signal source 210 includes a pulsed laser 212, which may include a built-in isolator 214. In some implementations, the pulsed laser 212 is a pulsed laser diode having, for example, the following characteristics: approximately 1561 nm wavelength, approximately 5 nanosecond pulse width, approximately 100 KHz frequency, approximately 50 μW power, and approximately 0.5 nJ pulse energy.

In some implementations, the preamplifier circuit includes a pump laser 222, a combiner 224, and an amplifier 226. In some implementations, the pump laser 222 is a single mode pump diode having, for example, a wavelength of approximately 976 nm. In some implementations, the combiner 224 is a wavelength division multiplexer (WDM) to combine a pulsed optical signal generated by the pulsed signal source 210 with a signal generated by the pump laser 222. In some implementations, the amplifier 226 is an erbium-doped single-mode fiber (Er-SMF).

In some implementations, the booster amplifier circuit 240, which is downstream from the preamplifier circuit 220, includes a pump laser 242, a combiner 244, and an amplifier 246. In some implementations, the pump laser 242 is a multimode pump diode having, for example, a wavelength of approximately 940 nm. In some implementations, combiner 244 is a (1+1:1) multimode combiner. In some implementations, the amplifier is an erbium/ytterbium-doped dispersion-compensating fiber (Er/Yb-DCF). In some implementations, the base optical circuit 200 further includes an isolator 228, such as a dual stage isolator, downstream from the preamplifier circuit 220 and upstream from the booster amplifier circuit 240.

While the base optical circuit 200 is configured to generate and transmit a pulsed optical signal, it does not include a detection circuit for generating a CW optical signal or capturing a CW component of a reflection signal. The base optical circuit 200 may be modified, as illustrated in and described with respect to FIGS. 3-8, to generate a hybrid transmission signal that includes a pulsed optical signal and a CW optical signal, as well as to include one or more additional components for detecting/capturing pulsed and CW components of a reflection signal.

Figure 3:
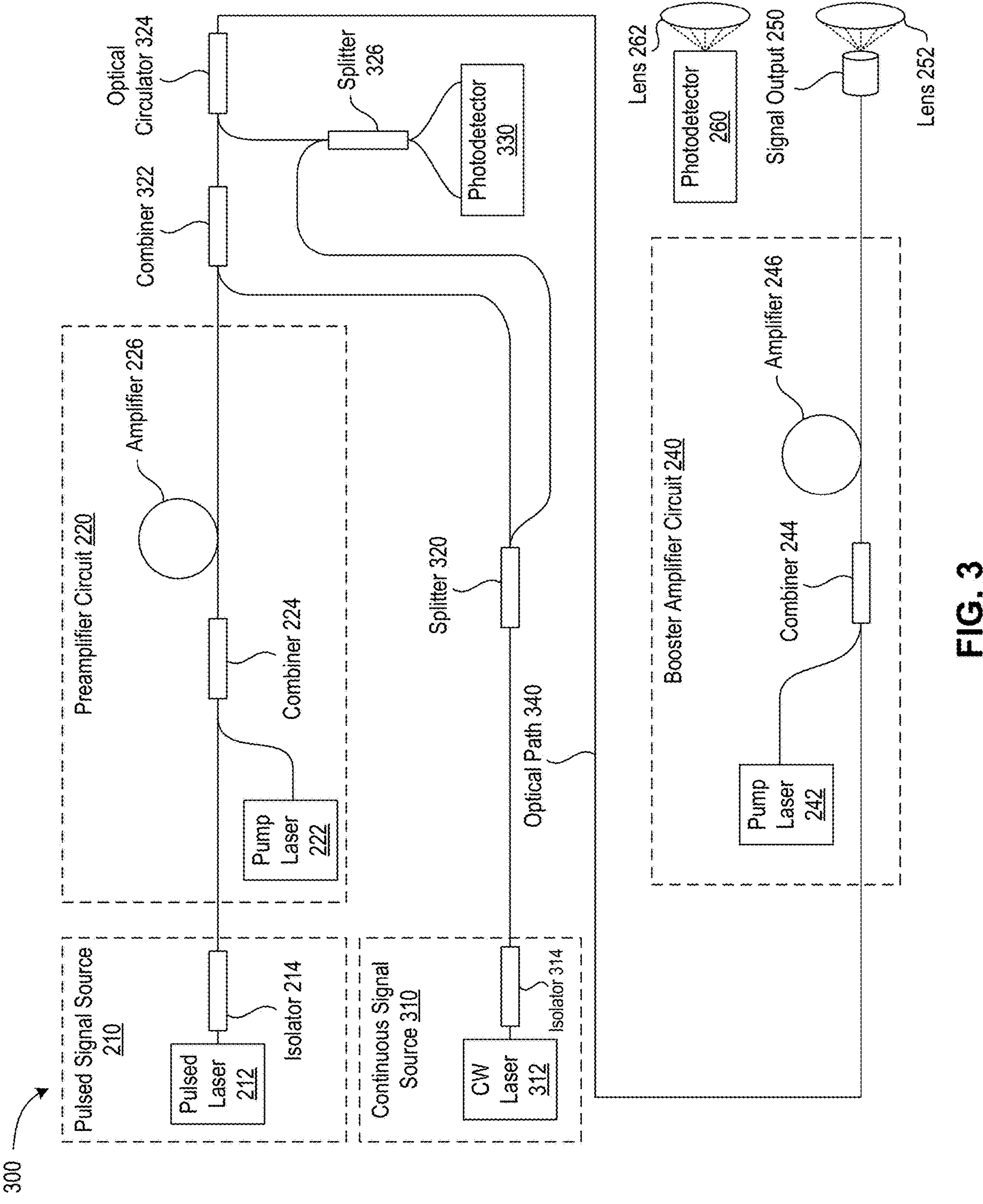
FIG. 3 illustrates an optical circuit for generating a hybrid transmission signal in accordance with an implementation of the present disclosure.

FIG. 3 illustrates an optical circuit 300 for generating a hybrid transmission signal in accordance with a further implementation of the present disclosure. The optical circuit 300 combines a pulsed optical signal with an unamplified CW optical signal into a hybrid transmission signal that is directed along an optical path 340 and to the booster amplifier circuit 240 prior to transmission. The optical path 340 is a bi-directional optical path, and the booster amplifier circuit 240 can act as a bi-directional amplifier for amplifying a reflection signal received and collimated by the lens 252 into the optical circuit 300.

In some implementations, the continuous signal source 310 includes a CW laser 312, which may include a built-in isolator 314. In some implementations, the CW laser 312 is a laser diode having, for example, the following characteristics: approximately 1550 nm wavelength and approximately 10 mW power. In some implementations, the CW optical signal may be modulated, for example, using a modulation circuit. The modulated CW optical signal may be frequency modulated, amplitude modulated, or a combination thereof. Implementations for which a frequency ramp is used to modulate the CW may exhibit improved power efficiency and greater range compared to an unmodulated CW optical signal.

In some implementations, the optical circuit 300 includes a splitter 320 (e.g., a 50/50 splitter) to split the CW optical signal into a reference signal (e.g., 5 mW) for a photodetector 330, and a CW optical signal for combining with the pulsed optical signal via a combiner 322 (e.g., a WDM). In some implementations, the photodetector 330 is a balanced photodetector for detecting a CW component of a reflection signal transmitted along the bi-directional optical path 340. In some implementations, the optical circuit 300 further includes a splitter 326 (e.g., a 50/50 splitter) just upstream from the photodetector 330, and an optical circulator 324. In some implementations, an amplified spontaneous emission (ASE) filter may be disposed between the optical circulator 324 and the splitter 326.

In some implementations, output power characteristics of the hybrid transmission signal after amplification by the booster amplifier circuit 240 are, for example, approximately 1 W for the pulsed component and approximately 100 mW for the CW component.

Figure 4:
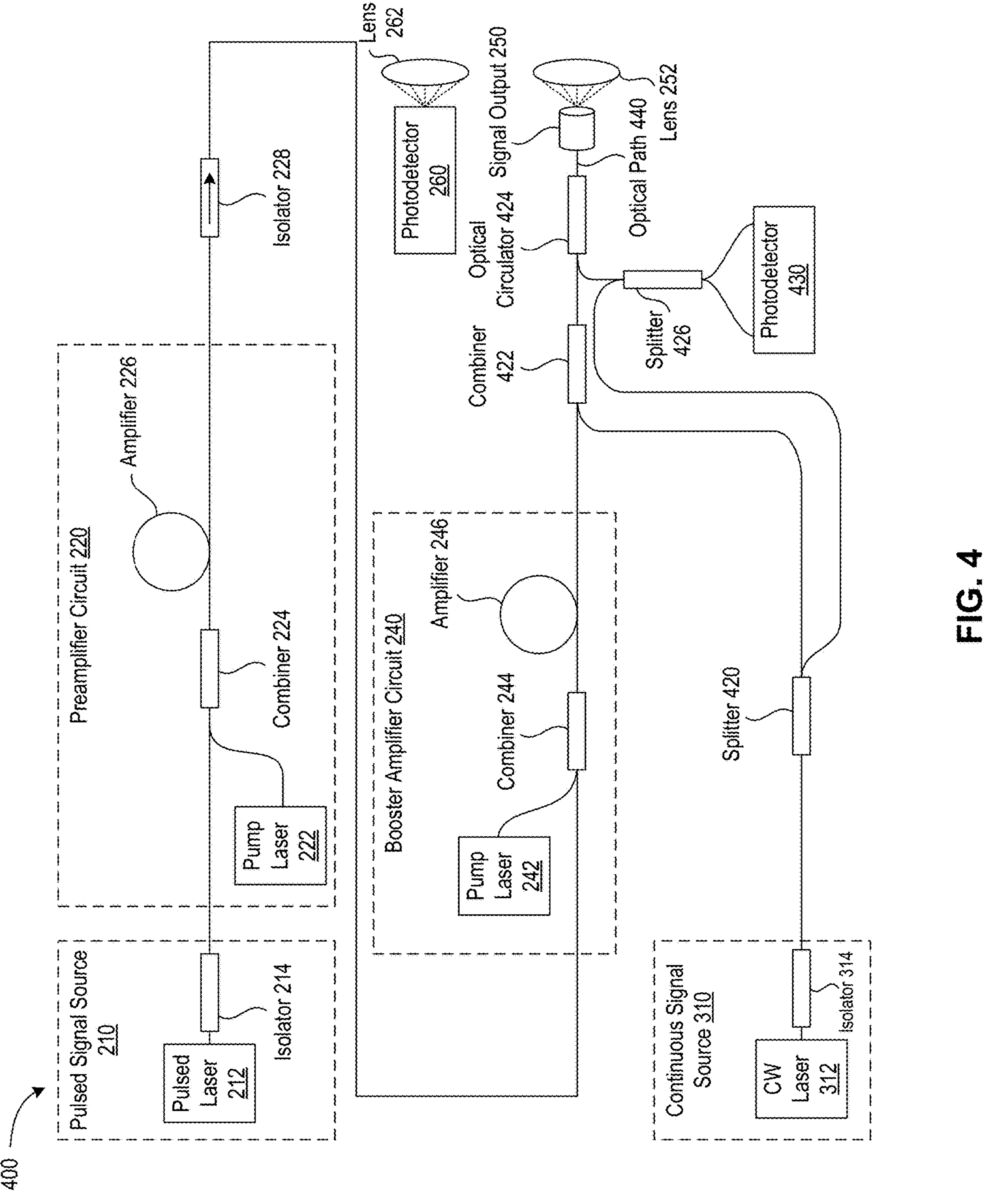
FIG. 4 illustrates an optical circuit for generating a hybrid transmission signal in accordance with a further implementation of the present disclosure.

FIG. 4 illustrates an optical circuit 400 for generating a hybrid transmission signal in accordance with a further implementation of the present disclosure. The optical circuit 400 combines a pulsed optical signal with an unamplified CW optical signal into a hybrid transmission signal that is directed along an optical path 440. In this configuration, the hybrid transmission signal is not amplified by either the preamplifier circuit 220 or the booster amplifier circuit 240 prior to transmission. The optical path 440 is a bi-directional optical path for directing a reflection signal to a photodetector 430. In some implementations, prior to being combined with the pulsed optical signal, the CW optical signal may be amplified with an amplifier, such as a Er/Yb-DCF or another erbium-doped fiber amplifier, such that a power of the amplified CW optical signal ranges from 100-200 mW.

In some implementations, the optical circuit 400 includes a splitter 420 (e.g., a 95/5 splitter) to split the CW optical signal into a reference signal (e.g., 2 mW) for a photodetector 430, and a CW optical signal for combining with the pulsed optical signal via a combiner 422 (e.g., a WDM). In some implementations, the photodetector 430 is a balanced photodetector for detecting a CW component of a reflection signal transmitted along the bi-directional optical path 440. In some implementations, the optical circuit 400 further includes a splitter 426 (e.g., a 50/50 splitter) just upstream from the photodetector 430, and an optical circulator 424.

In some implementations, output power characteristics of the hybrid transmission signal are, for example, approximately 1 W for the pulsed component and approximately 30 mW for the CW component.

Figure 5:
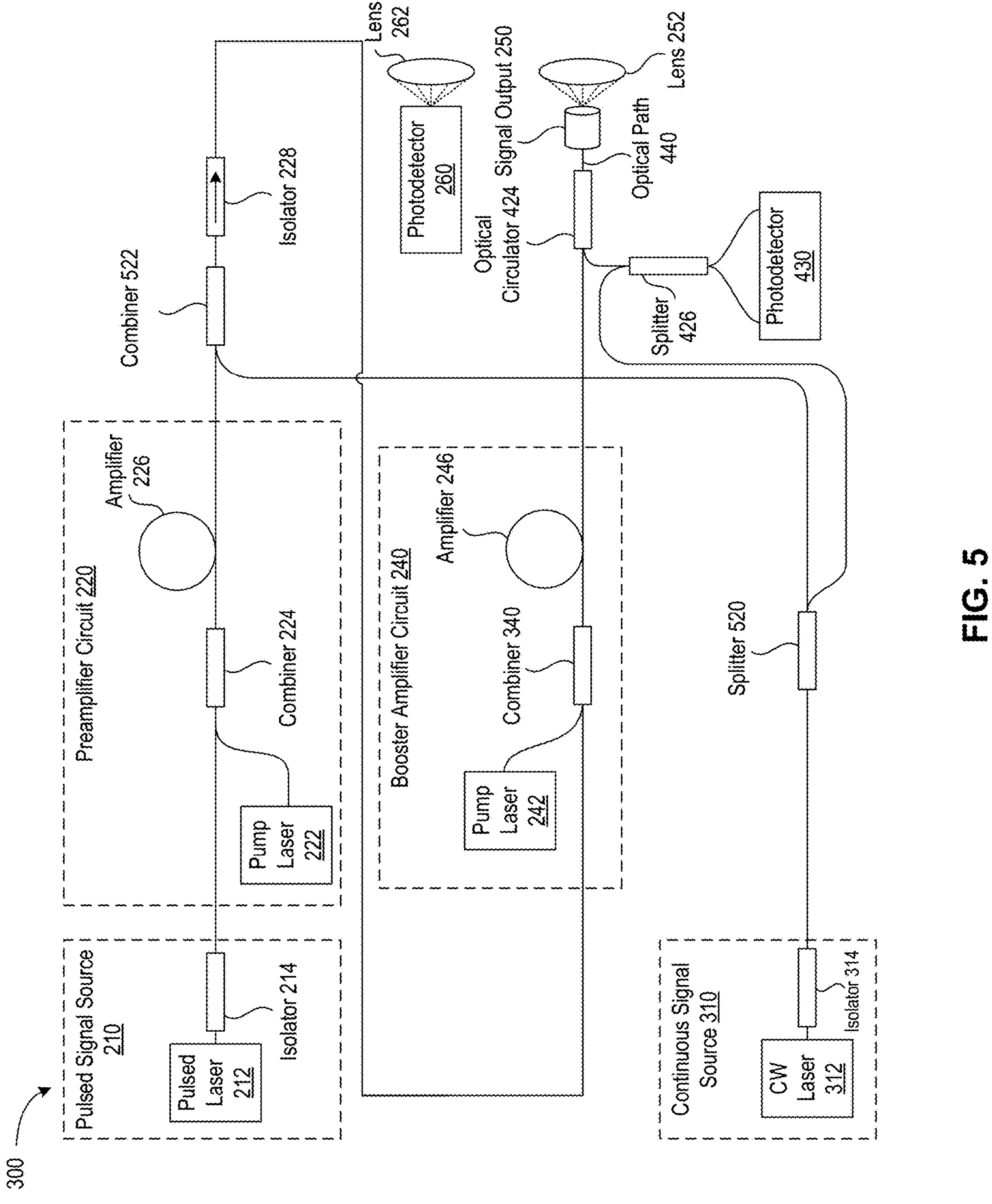
FIG. 5 illustrates an optical circuit for generating a hybrid transmission signal in accordance with a further implementation of the present disclosure.

FIG. 5 illustrates an optical circuit 500 for generating a hybrid transmission signal in accordance with a further implementation of the present disclosure. The optical circuit 500 combines a pulsed optical signal with an unamplified CW optical signal into a hybrid transmission signal that is directed along an optical path 540 and amplified by the booster amplifier circuit 240 prior to transmission. The optical path 540 is a bi-directional optical path for directing a reflection signal to a photodetector 430. In some implementations, prior to being combined with the pulsed optical signal, the CW optical signal may be amplified with an amplifier, such as a Er/Yb-DCF or another erbium-doped fiber amplifier, such that a power of the amplified CW optical signal ranges from 100-200 mW.

In some implementations, the optical circuit 500 includes a splitter 520 (e.g., a 50/50 splitter) to split the CW optical signal into a reference signal (e.g., 5 mW) for the photodetector 430, and a CW optical signal for combining with the pulsed optical signal via a combiner 522 (e.g., a WDM). In some implementations, the photodetector 430 is a balanced photodetector for detecting a CW component of a reflection signal transmitted along the bi-directional optical path 540.

In some implementations, output power characteristics of the hybrid transmission signal are, for example, approximately 1 W for the pulsed component and approximately 90 mW for the CW component.

Figure 6:
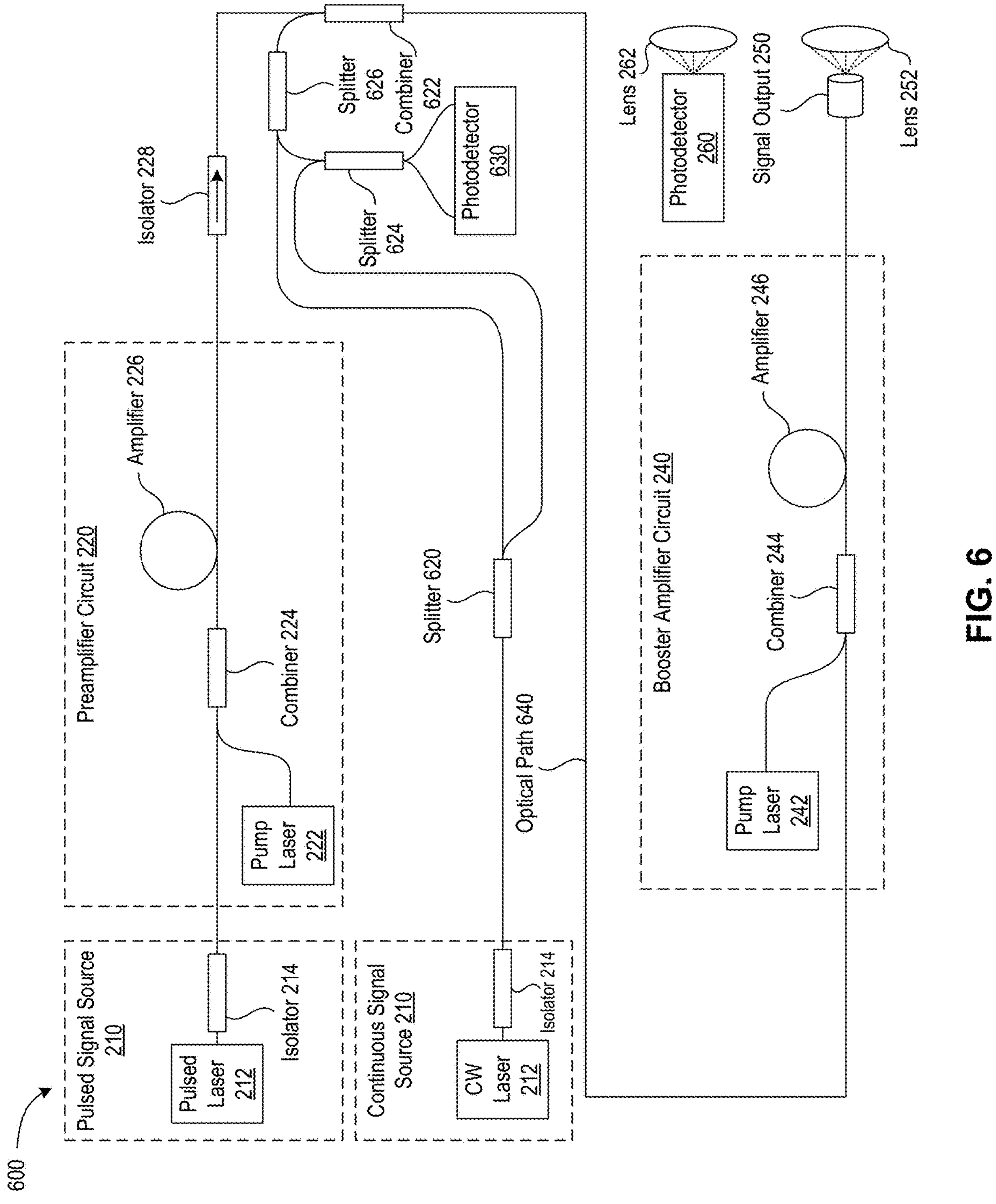
FIG. 6 illustrates an optical circuit for generating a hybrid transmission signal in accordance with a further implementation of the present disclosure.

FIG. 6 illustrates an optical circuit 600 for generating a hybrid transmission signal in accordance with a further implementation of the present disclosure. The optical circuit 600 combines a pulsed optical signal with an unamplified CW optical signal into a hybrid transmission signal that is directed along an optical path 640 and amplified by the booster amplifier circuit 240 prior to transmission. The optical path 640 is a bi-directional optical path for directing a reflection signal to a photodetector 630. In some implementations, prior to being combined with the pulsed optical signal, the CW optical signal may be amplified with an amplifier, such as a Er/Yb-DCF or another erbium-doped fiber amplifier, such that a power of the amplified CW optical signal ranges from 100-200 mW.

In some implementations, the optical circuit 600 includes a splitter 620 (e.g., a 75/25 splitter) to split the CW optical signal into a reference signal (e.g., 5 mW) for the photodetector 630, and a CW optical signal for combining with the pulsed optical signal via a combiner 622 (e.g., a WDM). In some implementations, the photodetector 630 is a balanced photodetector for detecting a CW component of a reflection signal transmitted along the bi-directional optical path 640. In some implementations, splitter 624 and splitter 626 are each 50/50 splitters.

In some implementations, output power characteristics of the hybrid transmission signal are, for example, approximately 1 W for the pulsed component and approximately 100 mW for the CW component.

Figure 7:
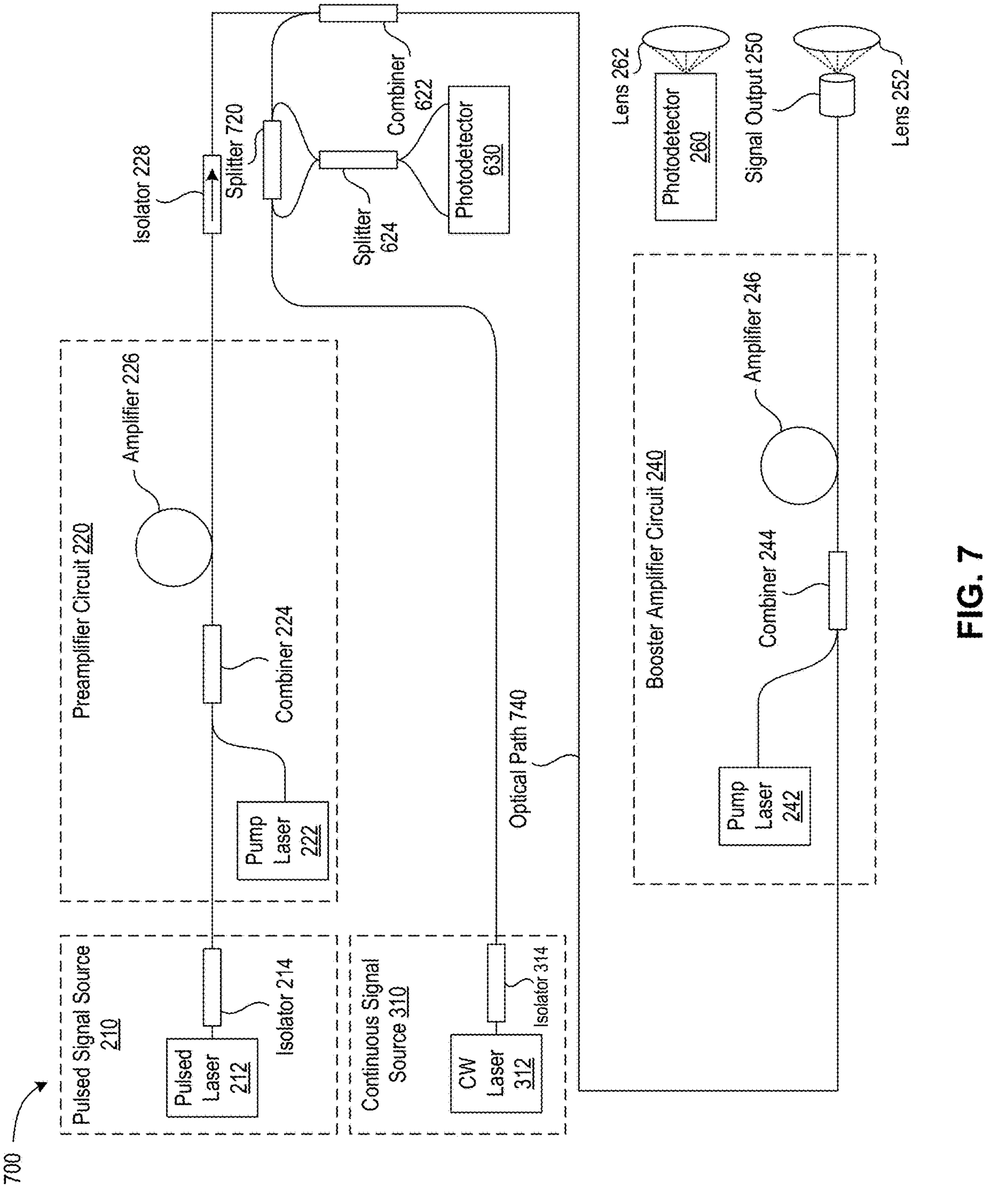
FIG. 7 illustrates an optical circuit for generating a hybrid transmission signal in accordance with a further implementation of the present disclosure.

FIG. 7 illustrates an optical circuit 700 for generating a hybrid transmission signal in accordance with a further implementation of the present disclosure. The optical circuit 700 combines a pulsed optical signal with an unamplified CW optical signal into a hybrid transmission signal that is directed along an optical path 740 and amplified by the booster amplifier circuit 240 prior to transmission. The optical path 740 is a bi-directional optical path for directing a reflection signal to a photodetector 630. In some implementations, prior to being combined with the pulsed optical signal, the CW optical signal may be amplified with an amplifier, such as a Er/Yb-DCF or another erbium-doped fiber amplifier, such that a power of the amplified CW optical signal ranges from 100-200 mW. The optical circuit 700 represents a variation of the optical circuit 600 where the splitter 620 is omitted and replaced with a splitter 720 (e.g., a 50/50 splitter) as illustrated.

In some implementations, output power characteristics of the hybrid transmission signal are, for example, approximately 1 W for the pulsed component and approximately 100 mW for the CW component.

Figure 8:
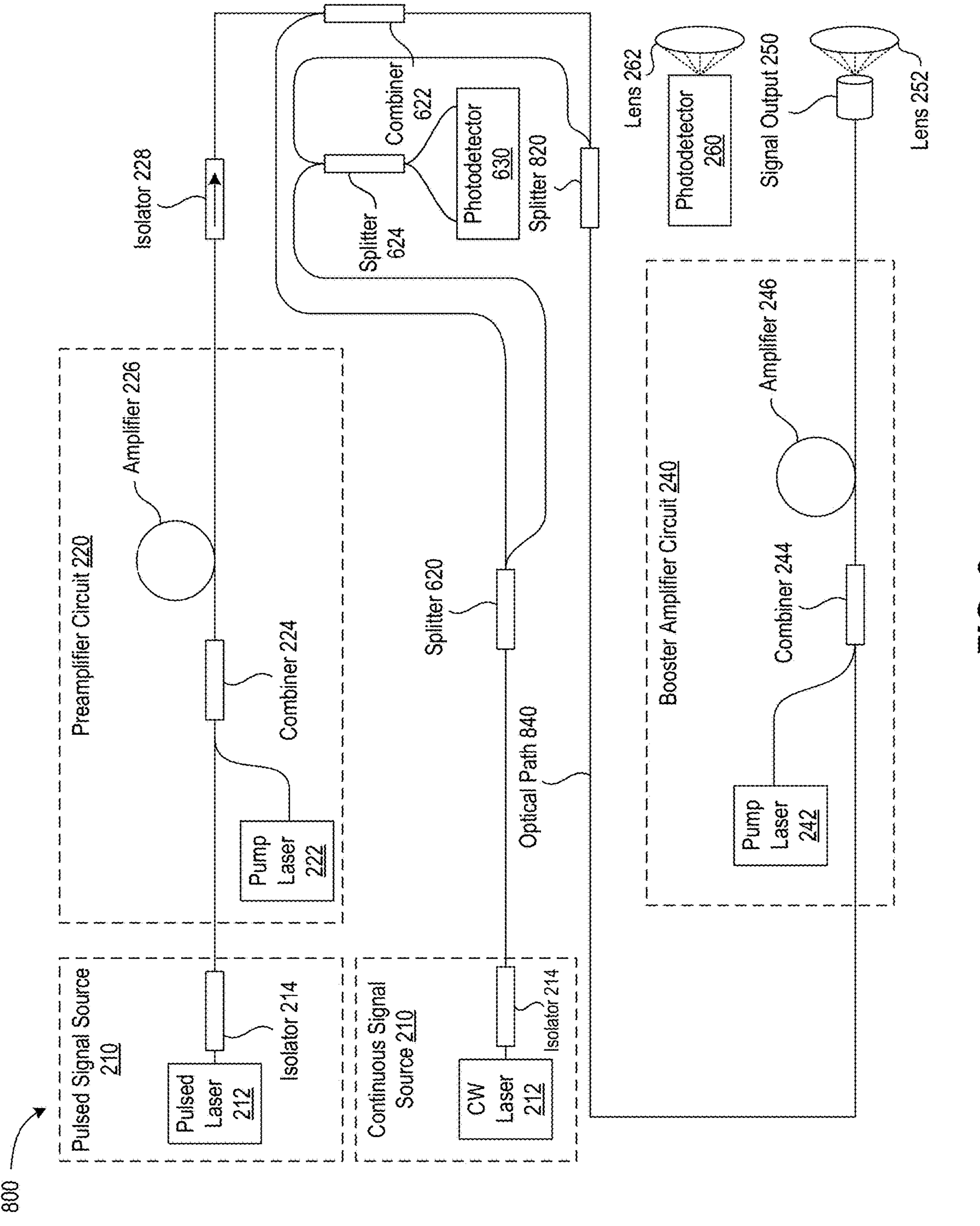
FIG. 8 illustrates an optical circuit for generating a hybrid transmission signal in accordance with a further implementation of the present disclosure.

FIG. 8 illustrates an optical circuit 800 for generating a hybrid transmission signal in accordance with a further implementation of the present disclosure. The optical circuit 800 combines a pulsed optical signal with an unamplified CW optical signal into a hybrid transmission signal that is directed along an optical path 840 and amplified by the booster amplifier circuit 240 prior to transmission. The optical path 840 is a bi-directional optical path for directing a reflection signal to a photodetector 630. In some implementations, prior to being combined with the pulsed optical signal, the CW optical signal may be amplified with an amplifier, such as a Er/Yb-DCF or another erbium-doped fiber amplifier, such that a power of the amplified CW optical signal ranges from 100-200 mW. The optical circuit 800 represents a variation of the optical circuit 600 where the splitter 626 is omitted and replaced with a splitter 820 (e.g., a 75/25 splitter) as illustrated. In some implementations, the splitter 820 may be replaced with an optical circulator.

In some implementations, output power characteristics of the hybrid transmission signal are, for example, approximately 1 W for the pulsed component and approximately 200 mW for the CW component.

Figure 9:
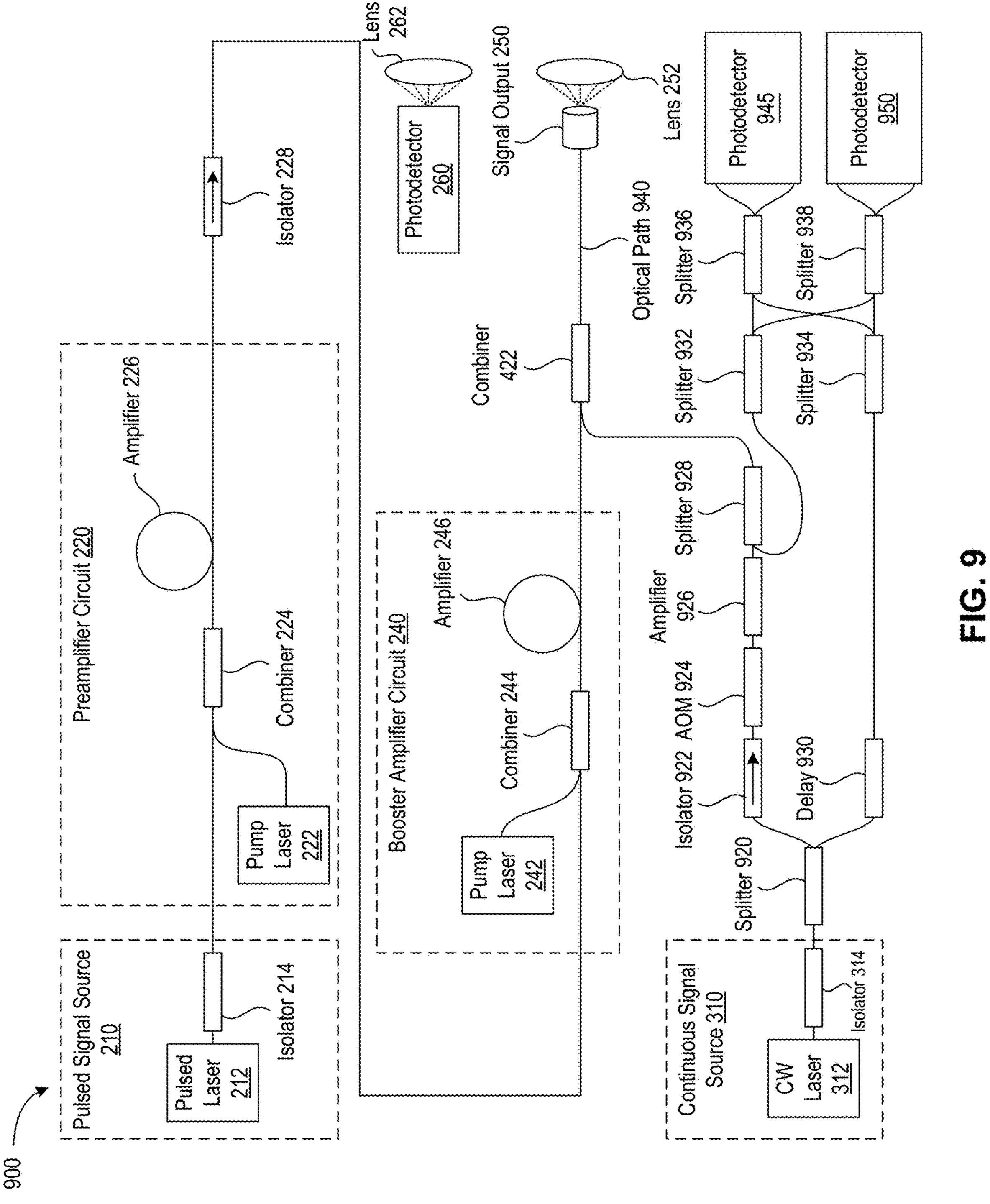
FIG. 9 illustrates an optical circuit for generating a hybrid transmission signal in accordance with a further implementation of the present disclosure.

FIG. 9 illustrates an optical circuit 900 for generating a hybrid transmission signal in accordance with a further implementation of the present disclosure. The optical circuit 900 combines a pulsed optical signal with an CW optical signal into a hybrid transmission signal that is directed along an optical path 940. The optical path 940 is a bi-directional optical path for directing a reflection signal to photodetectors 945 and 950.

The optical circuit 900 represents a variation of the optical circuit 400 and includes a cascade of components for amplification and modulation of the CW optical signal. In some implementations, the components include a splitter 920 (which may be a 75/25 splitter) to produce a higher power CW optical signal (e.g., approximately 20 mW) that is directed through an isolator 922, an acousto-optic modulator 924, an amplifier 926 (e.g., one or more erbium-doped fiber amplifiers), and a splitter 928. In some embodiments, the splitter 928 may be replaced with an optical circulator. A lower power CW optical signal (e.g., approximately 7.5 mW) is directed to a delay circuit 930. The splitters 932, 934, 936, and 938 are arranged to deliver the CW optical signal to the photodetectors 945 and 950. In some implementations, the splitters 932 and 934 are polarizing beam splitters that divide the light into its two orthogonal polarization components.

It is to be understood that the various optical circuits could be modified to have one or more components replaced or removed, include additional components, or otherwise be modified as would be appreciated by one of ordinary skill in the art. For example, one or more of the optical circuits described may utilize a separate optical path for receiving a CW component of an optical signal and directing it to a photodetector (e.g., a separate lens may be used to receive and direct the signal to the photodetectors 945 and 950 of the optical circuit 900 in lieu of receiving the signal via the lens 252 and the signal propagating along the optical path 940).

Figure 10:
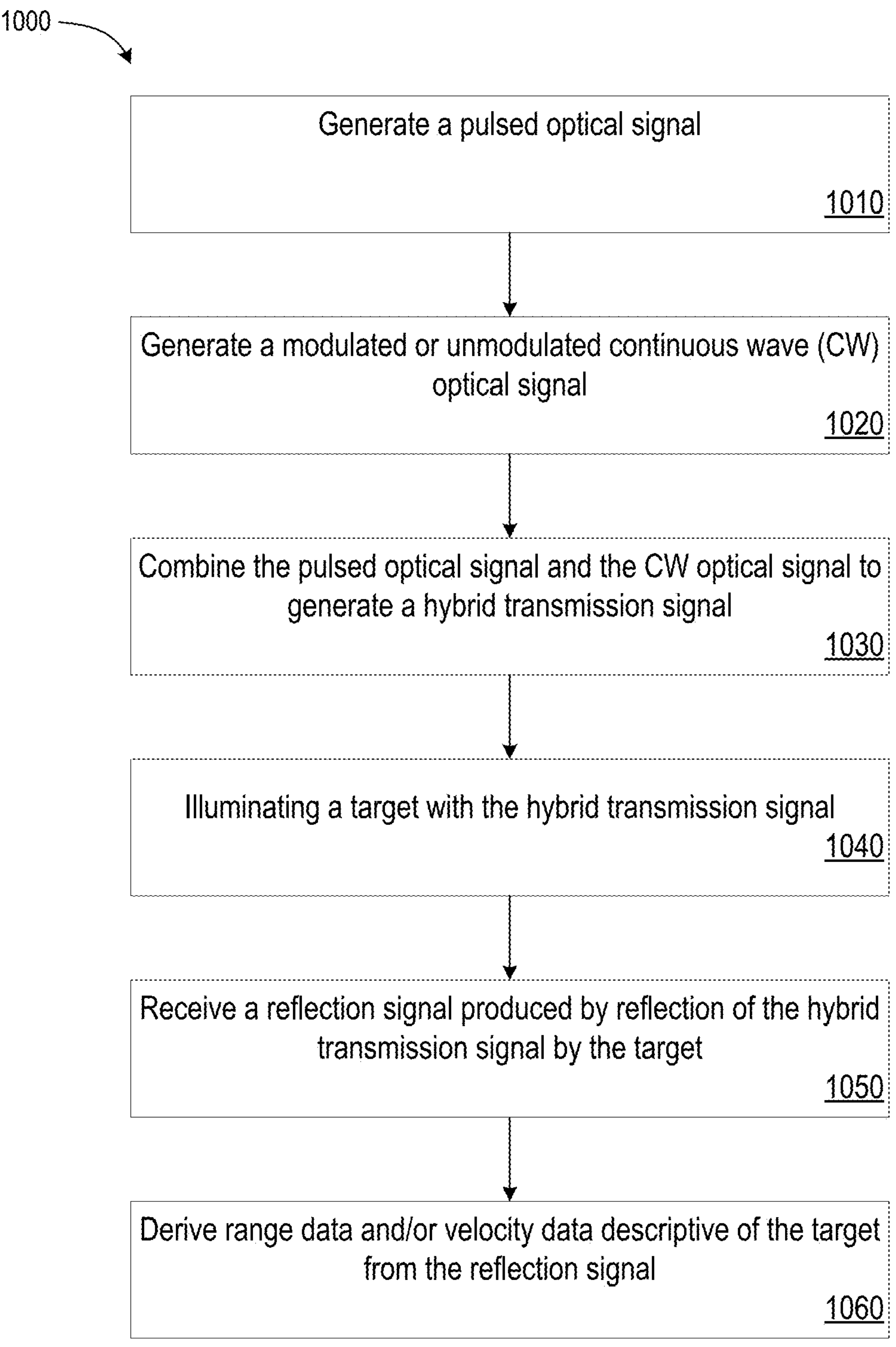
FIG. 10 depicts a block diagram illustrating a method of performing range and velocity imaging of a target in accordance with some implementations of the present disclosure.

FIG. 10 depicts a flow diagram illustrating a method 1000 of performing range and velocity imaging of a target in accordance with some implementations of the present disclosure. The method 1000 may be performed using one or more of the optical circuits described herein, and may be performed in combination with one or more components of the sensing system 120. In some implementations, certain operations may be performed by or under the control of a processing device, for example, having one or more processing units (CPU) and memory devices communicatively coupled to the CPU(s). In some implementations, the processing device can perform instructions from various components of the data processing system 130. Some operations of the method 1000 can be performed concurrently with other operations. Some operations can be optional.

Referring now to FIG. 10, the method 1000 begins at block 1010, where a pulsed optical signal is generated (e.g., generated by the pulsed signal source 210). For example, a pulsed laser diode may receive an activation signal from a pulsed laser diode driver that delivers a repeatable set of current pulses at a set output level over defined time intervals to cause the pulsed laser diode to generate the pulsed optical signal. The pulsed optical signal may have, for example, the following characteristics: approximately 1500 nm to 1600 nm wavelength, approximately 3-10 nanosecond pulse width, approximately 50 kHz to 250 kHz frequency, approximately 25 μW to 75 μW power, and approximately 0.1 nJ to 1 nJ pulse energy.

At block 1020, a modulated or unmodulated CW optical signal is generated (e.g., generated by the continuous signal source 310). For example, a CW laser may receive an activation signal that continuously pumps the CW laser to generate the CW optical signal. The CW optical signal may have, for example, the following characteristics: approximately 1500 nm to 1600 nm wavelength, and approximately 5 mW to 20 mW power.

In some implementations, at least the pulsed optical signal is amplified (e.g., via the preamplifier circuit 220). In some implementations, the CW optical signal is amplified (e.g., when combined into a hybrid transmission signal via the booster amplifier circuit 240, or by a separate amplifier circuit similar to the booster amplifier circuit 240).

At block 1030, the pulsed optical signal and the CW optical signal are combined (e.g., via the combiner 322, the combiner 422, etc.) to generate a hybrid transmission signal. In some implementations, the pulsed optical signal and the CW optical signal are combined in a bidirectional optical path (e.g., the optical path 340, the optical path 440, etc.). In some implementations, the pulsed optical signal and the CW optical signal are combined in free space (e.g., using a free space combiner) to generate the hybrid transmission signal prior to illuminating the target.

In some implementations, the hybrid transmission signal is amplified without first amplifying the CW optical signal (e.g., based on the configuration of the optical circuit 300 where the booster amplifier circuit 240 amplifies the hybrid transmission signal). In some implementations, the pulsed optical signal is amplified without amplifying the CW optical signal and the hybrid transmission signal (e.g., based on the configuration of the optical circuit 400, where the CW optical signal and the pulsed optical signal are combined downstream from the booster amplifier circuit 240).

At block 1040, the target (e.g., a static or dynamic object) is illuminated with the hybrid transmission signal.

At block 1050, the reflection signal produced by reflection of the hybrid transmission signal by the target is received. In some implementations, at least a portion of the reflection signal propagates along the bidirectional optical path in a direction opposite the hybrid transmission signal prior to capture by a photodetector (e.g., the photodetector 330, the photodetector 430, etc.), for example, to detect a CW component of the reflection signal. In some implementations, at least a portion of the reflection signal is received by a photodetector (e.g., the photodetector 260) configured to detect, for example, a pulsed component of the reflection signal.

At block 1060, range data and/or velocity data descriptive of the target is derived from the reflection signal (e.g., by the data processing system 130). In some implementations, the range data is derived from a first photodetector (e.g., the photodetector 260) configured to detect the pulsed component of the reflection signal. In some implementations, the velocity data is derived from a second photodetector configured to detect a CW component of the reflection signal (e.g., the photodetector 330, the photodetector 430, etc.).

Figure 11:
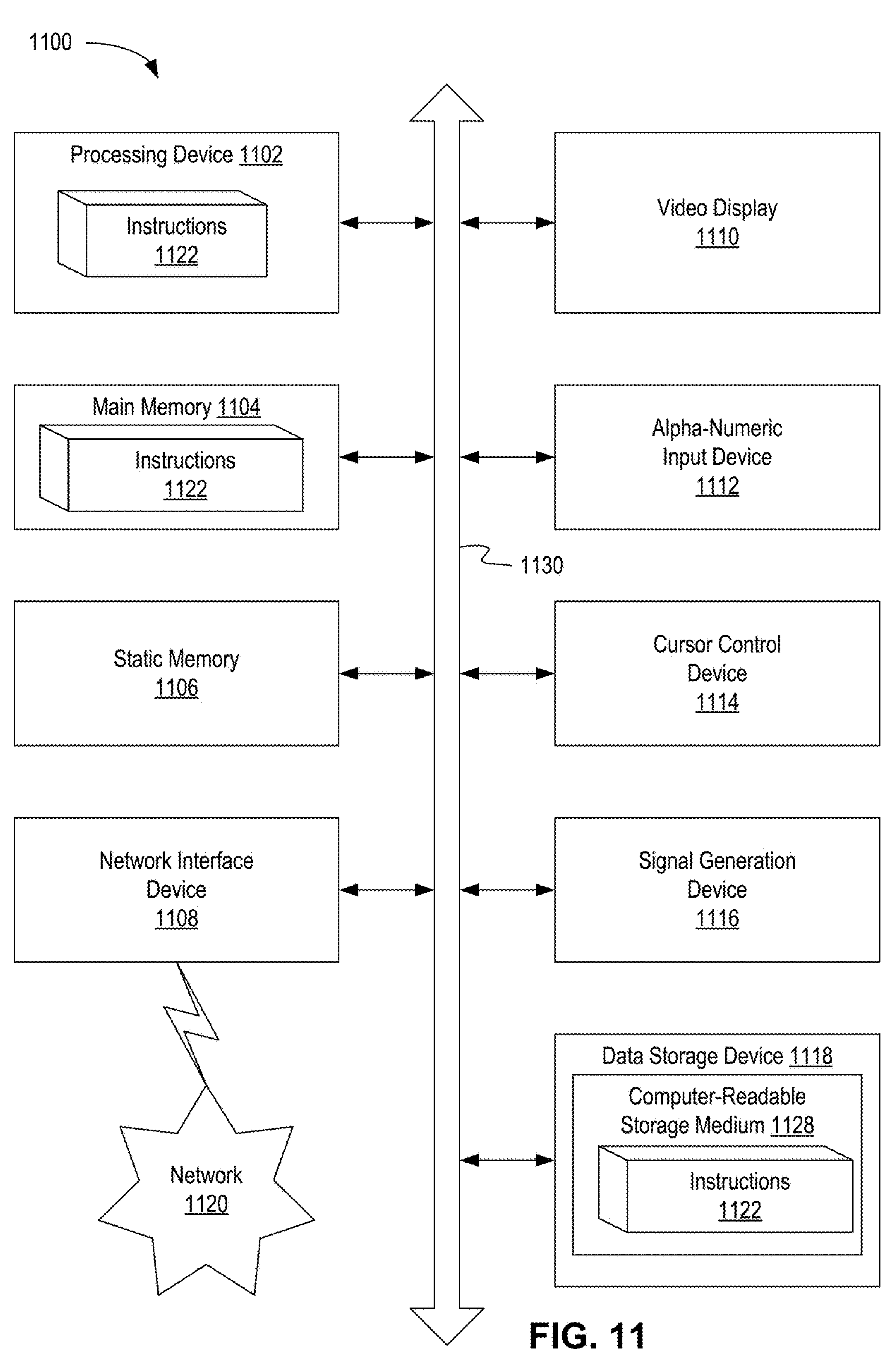
FIG. 11 depicts a block diagram of an example computer device for use in accordance with some implementations of the disclosure.

FIG. 11 depicts a block diagram of an example computer device 1100 capable of deriving data from signals generated by the various optical circuits described herein, as well as enabling Doppler-assisted object identification, tracking, and prediction for autonomous driving vehicle applications. Example computer device 1100 can be connected to other computer devices in a LAN, an intranet, an extranet, and/or the Internet. Computer device 1100 can operate in the capacity of a server in a client-server network environment. Computer device 1100 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1100 can include a processing device 1102 (also referred to as a processor or CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1118), which can communicate with each other via a bus 1130.

Processing device 1102 represents one or more general-purpose processing devices such as a microprocessor, central processing unit, or the like. More particularly, processing device 1102 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1102 can be configured to execute instructions for, for example, deriving velocity and/range data from reflection signals captured by the various optical circuits described herein.

Example computer device 1100 can further comprise a network interface device 1108, which can be communicatively coupled to a network 1120. Example computer device 1100 can further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1116 (e.g., a speaker).

Data storage device 1118 can include a computer-readable storage medium (or, more specifically, a non-transitory computer-readable storage medium) 1128 on which is stored one or more sets of executable instructions 1122. In accordance with one or more aspects of the present disclosure, executable instructions 1122 can comprise executable instructions for performing for operating and processing data from the optical circuits described herein.

Executable instructions 1122 can also reside, completely or at least partially, within main memory 1104 and/or within processing device 1102 during execution thereof by example computer device 1100, main memory 1104 and processing device 1102 also constituting computer-readable storage media. Executable instructions 1122 can further be transmitted or received over a network via network interface device 1108.

While the non-transitory computer-readable storage medium 1128 is shown in FIG. 11 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "applying," "removing," "identifying," "determining," "storing," "adjusting," "causing," "returning," "comparing," "creating," "stopping," "loading," "copying," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended example implementations. Accordingly, the specification and drawings are to be regarded in an illustrative sense rather than a restrictive sense. The scope of the present disclosure should, therefore, be determined with reference to example implementations below, along with the full scope of equivalents to which such implementations are entitled.

What is claimed is:

1. A light detection and ranging (LiDAR) system comprising:

a first signal source configured to generate a first signal for measuring a velocity of a target;

a second signal source configured to generate a second signal for measuring a range of the target;

a combiner to generate a hybrid transmission signal from the first signal generated by the first signal source and the second signal generated by the second signal source;

a first photodetector to measure a first component of a reflection signal related to the range of the target based on a first component of a reflection signal reflected from the target; and a second photodetector to measure a second component of the reflection signal related to the velocity of the target based on a second component of the reflection signal reflected from the target, wherein the system is configured to derive the range and the velocity of the target from the first component and the second component, respectively.

2. The LiDAR system of claim 1, wherein the first signal source comprises a continuous wave (CW) laser source.

3. The LiDAR system of claim 1, wherein the second signal source comprises a pulsed-laser source.

4. The LiDAR system of claim 1, wherein the combiner is configured to combine the first signal from the first signal source and the second signal from the second signal source in a bidirectional optical path.

5. The LiDAR system of claim 4, wherein the bidirectional optical path is configured to allow for at least a portion of the reflection signal to propagate therethrough in a direction opposite the hybrid transmission signal prior to capture by the first photodetector or the second photodetector.

6. The LiDAR system of claim 1, further comprising:

an optical amplifier circuit to amplify the reflection signal.

7. The LiDAR system of claim 1, wherein the first component corresponds to a pulsed component of the reflection signal, and wherein the second component corresponds to a continuous wave component of the reflection signal.

8. A method comprising:

illuminating a target with a hybrid transmission signal comprising a first signal from a first signal source and a second signal from a second signal source, the first signal for measuring a velocity of the target and the second signal for measuring a range of the target;

receiving a reflection signal produced by reflection of the hybrid transmission signal by the target; deriving range data from a photodetector configured to measure the range of the target based on a first component of the reflection signal; and deriving related to the range and velocity data from a second photodetector configured to measure the velocity of the target based on a second component of the reflection signal related to the velocity.

9. The method of claim 8, wherein the first signal comprises a pulsed optical signal, and wherein the second signal comprises a continuous wave (CW) optical signal.

10. The method of claim 9, wherein the pulsed optical signal and the CW optical signal are combined in a bidirectional optical path.

11. The method of claim 10, further comprising:

amplifying the hybrid transmission signal without first amplifying the CW optical signal.

12. The method of claim 9, further comprising:

amplifying at least the pulsed optical signal.

13. The method of claim 9, further comprising:

amplifying the pulsed optical signal without amplifying the CW optical signal and the hybrid transmission signal.

14. The method of claim 8, wherein deriving range data of the target from a first component of the reflection signal related to range and velocity data of the target from a second component of the reflection signal related to velocity comprises:

deriving the range data from a first photodetector configured to detect the first component of the reflection signal comprises a pulsed component of the reflection signal, and deriving the velocity data from a second photodetector configured to detect the second component of the reflection signal comprises a CW component of the reflection signal.

15. A sensing system comprising:

a computing device configured to:

generate a combined signal from at least a first signal source and a second signal source, the first signal source configured to generate a first signal for measuring a velocity of a target and the second signal source configured to generate a second signal for measuring a range of the target;

transmit the combined signal; and derive range data from a first photodetector configured to measure the range of the target based on a first component of a reflection signal received responsive to transmission of the combined signal; and derive velocity data from a second photodetector configured to measure the velocity of the target based on a second component of the from a reflection signal received responsive to transmission of the combined signal.

16. The sensing system of claim 15, wherein the first signal source comprises a continuous wave (CW) laser source, and wherein the second signal source comprises a pulsed-laser source.

17. The sensing system of claim 15, wherein the computing device is further configured to combine the first signal from the first signal source and the second signal from the second signal source in a bidirectional optical path.

18. The sensing system of claim 17, wherein the bidirectional optical path is configured to allow for at least a portion of the reflection signal to propagate therethrough in a direction opposite the combined signal prior to capture by a photodetector.

19. The sensing system of claim 15, further comprising: an optical amplifier circuit to amplify the reflection signal.

20. The sensing system of claim 15, wherein the computing device is communicatively coupled to a data processing system of a vehicle to provide the range data and the velocity data to the data processing system for controlling the vehicle.

* * * * *